US008832083B1

(12) United States Patent
Chen et al.

(10) Patent No.: US 8,832,083 B1
(45) Date of Patent: Sep. 9, 2014

(54) COMBINING USER FEEDBACK

(75) Inventors: Zhihui Chen, Menlo Park, CA (US);
Hyung-Jin Kim, Sunnyvale, CA (US);
Henele I. Adams, San Francisco, CA (US); Nitin Khandelwal, San Jose, CA (US); Varun Kacholia, Sunnyvale, CA (US); David P. Stoutamire, Redwood City, CA (US)

(73) Assignee: Google Inc., Mountain View, CA (US)

( * ) Notice: Subject to any disclaimer, the term of this patent is extended or adjusted under 35 U.S.C. 154(b) by 308 days.

(21) Appl. No.: 12/842,345

(22) Filed: Jul. 23, 2010

(51) Int. Cl.
*G06F 7/06* (2006.01)
*G06F 17/30* (2006.01)

(52) U.S. Cl.
USPC ............................................. 707/723

(58) Field of Classification Search
None
See application file for complete search history.

(56) References Cited

U.S. PATENT DOCUMENTS

| | | | |
|---|---|---|---|
| 5,265,065 A | 11/1993 | Turtle | |
| 5,488,725 A | 1/1996 | Turtle | |
| 5,696,962 A | 12/1997 | Kupiec | |
| 5,920,854 A | 7/1999 | Kirsch et al. | |
| 5,963,940 A | 10/1999 | Liddy et al. | |
| 6,006,222 A | 12/1999 | Culliss | |
| 6,014,665 A | 1/2000 | Culliss | |
| 6,026,388 A | 2/2000 | Liddy et al. | |
| 6,067,565 A | 5/2000 | Horvitz | |
| 6,078,916 A | 6/2000 | Culliss | |
| 6,078,917 A | 6/2000 | Paulsen et al. | |
| 6,088,692 A | 7/2000 | Driscoll | |
| 6,134,532 A | 10/2000 | Lazarus et al. | |
| 6,182,066 B1 | 1/2001 | Marques | |
| 6,182,068 B1 | 1/2001 | Culliss | |
| 6,185,559 B1 | 2/2001 | Brin et al. | |
| 6,249,252 B1 | 6/2001 | Dupray | |
| 6,285,999 B1 | 9/2001 | Page | |
| 6,321,228 B1 | 11/2001 | Crandall et al. | |
| 6,327,590 B1 | 12/2001 | Chidlovskii et al. | |

(Continued)

FOREIGN PATENT DOCUMENTS

| | | |
|---|---|---|
| WO | WO 00/77689 | 12/2000 |
| WO | WO 01/16807 | 3/2001 |
| WO | WO 01/67297 | 9/2001 |
| WO | WO 2004/059514 | 7/2004 |

OTHER PUBLICATIONS

Agichtein, et al; *Improving Web Search Ranking by Incorporating User Behavior Information*; Aug. 2006; Proceedings of the Twenty-Ninth Annual International ACM SIGIR Conference on Research and Development in Information Retrieval, p. 19-26.

(Continued)

*Primary Examiner* — Uyen Le
(74) *Attorney, Agent, or Firm* — Fish & Richardson P.C.

(57) ABSTRACT

Obtaining search results responsive to a query, each search result identifying a respective resource and each resource having a respective rank determined by a primary ranking algorithm. The method includes obtaining primary user feedback data and secondary user feedback data for the resource. The primary and secondary user feedback data representing previous user interactions with the resource when the resource was presented as a search result responsive to the query. The method also includes applying a weight to the secondary user feedback data, the weight being at least partially based on a threshold quantity of the primary user feedback data. The method also includes aggregating the primary user feedback data and the weighted secondary user feedback data and modifying the respective rank of the resource as a search result for the query based at least partially on the aggregated data.

27 Claims, 8 Drawing Sheets

(56) References Cited

U.S. PATENT DOCUMENTS

| | | |
|---|---|---|
| 6,341,283 B1 | 1/2002 | Yamakawa et al. |
| 6,353,849 B1 | 3/2002 | Linsk |
| 6,363,378 B1 | 3/2002 | Conklin et al. |
| 6,370,526 B1 | 4/2002 | Agrawal et al. |
| 6,421,675 B1 | 7/2002 | Ryan et al. |
| 6,480,843 B2 | 11/2002 | Li |
| 6,490,575 B1 | 12/2002 | Berstis |
| 6,526,440 B1 | 2/2003 | Bharat |
| 6,529,903 B2 | 3/2003 | Smith et al. |
| 6,539,377 B1 | 3/2003 | Culliss |
| 6,560,590 B1 | 5/2003 | Shwe et al. |
| 6,567,103 B1 | 5/2003 | Chaudhry |
| 6,587,848 B1 | 7/2003 | Aggarwal et al. |
| 6,615,209 B1 | 9/2003 | Gomes |
| 6,623,529 B1 | 9/2003 | Lakritz |
| 6,658,423 B1 | 12/2003 | Pugh et al. |
| 6,671,681 B1 | 12/2003 | Emens et al. |
| 6,678,681 B1 | 1/2004 | Brin et al. |
| 6,701,309 B1 | 3/2004 | Beeferman et al. |
| 6,725,259 B1 | 4/2004 | Bharat |
| 6,738,764 B2 | 5/2004 | Mao et al. |
| 6,754,873 B1 | 6/2004 | Law et al. |
| 6,792,416 B2 | 9/2004 | Soetarman et al. |
| 6,795,820 B2 | 9/2004 | Barnett |
| 6,816,850 B2 | 11/2004 | Culliss |
| 6,853,993 B2 | 2/2005 | Ortega et al. |
| 6,873,982 B1 | 3/2005 | Bates et al. |
| 6,877,002 B2 | 4/2005 | Prince |
| 6,882,999 B2 | 4/2005 | Cohen et al. |
| 6,901,402 B1 | 5/2005 | Corston-Oliver et al. |
| 6,912,505 B2 | 6/2005 | Linden et al. |
| 6,944,611 B2 | 9/2005 | Flank et al. |
| 6,944,612 B2 | 9/2005 | Roustant et al. |
| 6,954,750 B2 | 10/2005 | Bradford |
| 6,963,867 B2 | 11/2005 | Ford et al. |
| 6,990,453 B2 | 1/2006 | Wang et al. |
| 7,016,939 B1 | 3/2006 | Rothwell et al. |
| 7,028,027 B1 | 4/2006 | Zha et al. |
| 7,072,886 B2 | 7/2006 | Salmenkaita et al. |
| 7,085,761 B2 | 8/2006 | Shibata |
| 7,113,939 B2 | 9/2006 | Chou et al. |
| 7,117,206 B1 | 10/2006 | Bharat et al. |
| 7,136,849 B2 | 11/2006 | Patrick |
| 7,146,361 B2 | 12/2006 | Broder et al. |
| 7,222,127 B1 | 5/2007 | Bem et al. |
| 7,231,399 B1 | 6/2007 | Bem et al. |
| 7,243,102 B1 * | 7/2007 | Naam et al. ............ 1/1 |
| 7,266,765 B2 | 9/2007 | Golovchinsky et al. |
| 7,293,016 B1 | 11/2007 | Shakib et al. |
| 7,379,951 B2 | 5/2008 | Chkodrov et al. |
| 7,382,358 B2 | 6/2008 | Kushler et al. |
| 7,395,222 B1 | 7/2008 | Sotos |
| 7,426,507 B1 | 9/2008 | Patterson |
| 7,451,487 B2 | 11/2008 | Oliver et al. |
| 7,505,964 B2 | 3/2009 | Tong et al. |
| 7,516,146 B2 | 4/2009 | Robertson et al. |
| 7,526,470 B1 | 4/2009 | Karnawat et al. |
| 7,533,092 B2 | 5/2009 | Berkhin et al. |
| 7,533,130 B2 | 5/2009 | Narayana et al. |
| 7,552,112 B2 | 6/2009 | Jhala et al. |
| 7,565,363 B2 | 7/2009 | Anwar |
| 7,565,367 B2 | 7/2009 | Barrett et al. |
| 7,566,363 B2 | 7/2009 | Starling et al. |
| 7,574,530 B2 | 8/2009 | Wang et al. |
| 7,584,181 B2 | 9/2009 | Zeng et al. |
| 7,610,282 B1 | 10/2009 | Datar et al. |
| 7,636,714 B1 | 12/2009 | Lamping et al. |
| 7,657,626 B1 | 2/2010 | Zwicky |
| 7,680,775 B2 | 3/2010 | Levin et al. |
| 7,693,818 B2 | 4/2010 | Majumder |
| 7,716,225 B1 | 5/2010 | Dean et al. |
| 7,747,612 B2 | 6/2010 | Thun et al. |
| 7,756,887 B1 | 7/2010 | Haveliwala |
| 7,783,632 B2 | 8/2010 | Richardson et al. |
| 7,801,885 B1 | 9/2010 | Verma |
| 7,809,716 B2 | 10/2010 | Wang et al. |
| 7,818,315 B2 | 10/2010 | Cucerzan et al. |
| 7,818,320 B2 | 10/2010 | Makeev |
| 7,836,058 B2 | 11/2010 | Chellapilla et al. |
| 7,844,589 B2 | 11/2010 | Wang et al. |
| 7,849,089 B2 | 12/2010 | Zhang et al. |
| 7,853,557 B2 | 12/2010 | Schneider et al. |
| 7,860,886 B2 | 12/2010 | Loftesness |
| 7,877,404 B2 | 1/2011 | Achan et al. |
| 7,895,177 B2 | 2/2011 | Wu |
| 7,925,498 B1 | 4/2011 | Baker et al. |
| 7,953,740 B1 | 5/2011 | Vadon et al. |
| 7,974,974 B2 * | 7/2011 | Tankovich et al. ............ 707/729 |
| 7,987,185 B1 * | 7/2011 | Mysen et al. ............ 707/733 |
| 8,001,136 B1 | 8/2011 | Papachristou et al. |
| 8,019,650 B2 | 9/2011 | Donsbach et al. |
| 8,024,326 B2 | 9/2011 | Tong et al. |
| 8,024,330 B1 | 9/2011 | Franco et al. |
| 8,027,439 B2 | 9/2011 | Zoldi et al. |
| 8,037,042 B2 | 10/2011 | Anderson et al. |
| 8,037,086 B1 | 10/2011 | Upstill et al. |
| 8,051,061 B2 | 11/2011 | Niu et al. |
| 8,060,456 B2 | 11/2011 | Gao et al. |
| 8,060,497 B1 | 11/2011 | Zatsman et al. |
| 8,065,296 B1 | 11/2011 | Franz et al. |
| 8,069,182 B2 | 11/2011 | Pieper |
| 8,073,263 B2 | 12/2011 | Hull et al. |
| 8,073,772 B2 | 12/2011 | Bishop et al. |
| 8,086,599 B1 | 12/2011 | Heymans |
| 8,086,690 B1 | 12/2011 | Heymans |
| 8,090,717 B1 | 1/2012 | Bharat et al. |
| 8,156,111 B2 | 4/2012 | Jones et al. |
| 8,224,827 B2 | 7/2012 | Dean et al. |
| 8,412,699 B1 | 4/2013 | Mukherjee et al. |
| 8,458,165 B2 | 6/2013 | Liao et al. |
| 8,498,974 B1 | 7/2013 | Kim et al. |
| 8,521,725 B1 | 8/2013 | Pearson et al. |
| 2001/0000356 A1 | 4/2001 | Woods |
| 2002/0034292 A1 | 3/2002 | Tuoriniemi et al. |
| 2002/0042791 A1 | 4/2002 | Smith et al. |
| 2002/0049752 A1 | 4/2002 | Bowman et al. |
| 2002/0103790 A1 | 8/2002 | Wang et al. |
| 2002/0123988 A1 | 9/2002 | Dean et al. |
| 2002/0133481 A1 | 9/2002 | Smith et al. |
| 2002/0165849 A1 | 11/2002 | Singh et al. |
| 2003/0009399 A1 | 1/2003 | Boerner |
| 2003/0018707 A1 | 1/2003 | Flocken |
| 2003/0028529 A1 | 2/2003 | Cheung et al. |
| 2003/0037074 A1 | 2/2003 | Dwork et al. |
| 2003/0078914 A1 | 4/2003 | Witbrock |
| 2003/0120654 A1 | 6/2003 | Edlund et al. |
| 2003/0135490 A1 | 7/2003 | Barrett et al. |
| 2003/0149704 A1 | 8/2003 | Yayoi et al. |
| 2003/0167252 A1 | 9/2003 | Odom et al. |
| 2003/0195877 A1 | 10/2003 | Ford et al. |
| 2003/0204495 A1 | 10/2003 | Lehnert |
| 2003/0220913 A1 | 11/2003 | Doganata et al. |
| 2003/0229640 A1 | 12/2003 | Carlson et al. |
| 2004/0006456 A1 | 1/2004 | Loofbourrow |
| 2004/0006740 A1 | 1/2004 | Krohn et al. |
| 2004/0034632 A1 | 2/2004 | Carmel et al. |
| 2004/0049486 A1 | 3/2004 | Scanlon et al. |
| 2004/0059708 A1 | 3/2004 | Dean et al. |
| 2004/0083205 A1 | 4/2004 | Yeager |
| 2004/0093325 A1 | 5/2004 | Banerjee et al. |
| 2004/0119740 A1 | 6/2004 | Chang et al. |
| 2004/0122811 A1 | 6/2004 | Page |
| 2004/0153472 A1 | 8/2004 | Rieffanaugh, Jr. |
| 2004/0158560 A1 | 8/2004 | Wen et al. |
| 2004/0186828 A1 | 9/2004 | Yadav |
| 2004/0186996 A1 | 9/2004 | Gibbs et al. |
| 2004/0199419 A1 | 10/2004 | Kim et al. |
| 2004/0215607 A1 | 10/2004 | Travis, Jr. |
| 2005/0015366 A1 | 1/2005 | Carrasco et al. |
| 2005/0027691 A1 | 2/2005 | Brin et al. |
| 2005/0033803 A1 | 2/2005 | Vleet et al. |
| 2005/0050014 A1 | 3/2005 | Gosse et al. |
| 2005/0055342 A1 | 3/2005 | Bharat et al. |
| 2005/0055345 A1 | 3/2005 | Ripley |

(56) References Cited

U.S. PATENT DOCUMENTS

| | | |
|---|---|---|
| 2005/0060290 A1 | 3/2005 | Herscovici et al. |
| 2005/0060310 A1 | 3/2005 | Tong et al. |
| 2005/0060311 A1 | 3/2005 | Tong et al. |
| 2005/0071741 A1 | 3/2005 | Acharya et al. |
| 2005/0102282 A1 | 5/2005 | Linden |
| 2005/0125376 A1 | 6/2005 | Curtis et al. |
| 2005/0160083 A1 | 7/2005 | Robinson |
| 2005/0192946 A1 | 9/2005 | Lu et al. |
| 2005/0198026 A1 | 9/2005 | Dehlinger et al. |
| 2005/0222987 A1 | 10/2005 | Vadon |
| 2005/0222998 A1 | 10/2005 | Driessen et al. |
| 2005/0240576 A1 | 10/2005 | Piscitello et al. |
| 2005/0240580 A1 | 10/2005 | Zamir et al. |
| 2005/0256848 A1 | 11/2005 | Alpert et al. |
| 2006/0047643 A1 | 3/2006 | Chaman |
| 2006/0069667 A1 | 3/2006 | Manasse et al. |
| 2006/0074903 A1 | 4/2006 | Meyerzon et al. |
| 2006/0089926 A1 | 4/2006 | Knepper et al. |
| 2006/0095421 A1 | 5/2006 | Nagai et al. |
| 2006/0106793 A1 | 5/2006 | Liang |
| 2006/0173830 A1 | 8/2006 | Smyth et al. |
| 2006/0195443 A1 | 8/2006 | Franklin et al. |
| 2006/0200476 A1 | 9/2006 | Gottumukkala et al. |
| 2006/0200556 A1 | 9/2006 | Brave et al. |
| 2006/0227992 A1 | 10/2006 | Rathus et al. |
| 2006/0230040 A1 | 10/2006 | Curtis et al. |
| 2006/0293950 A1 | 12/2006 | Meek et al. |
| 2007/0005575 A1 | 1/2007 | Dai et al. |
| 2007/0005588 A1 | 1/2007 | Zhang et al. |
| 2007/0038659 A1 | 2/2007 | Datar et al. |
| 2007/0050339 A1 | 3/2007 | Kasperski et al. |
| 2007/0061195 A1 | 3/2007 | Liu et al. |
| 2007/0061211 A1 | 3/2007 | Ramer et al. |
| 2007/0081197 A1 | 4/2007 | Omoigui |
| 2007/0106659 A1 | 5/2007 | Lu et al. |
| 2007/0112730 A1 | 5/2007 | Gulli et al. |
| 2007/0130370 A1 | 6/2007 | Akaezuwa |
| 2007/0156677 A1 | 7/2007 | Szabo |
| 2007/0172155 A1 | 7/2007 | Guckenberger |
| 2007/0180355 A1 | 8/2007 | McCall et al. |
| 2007/0192190 A1 | 8/2007 | Granville |
| 2007/0208730 A1 | 9/2007 | Agichtein et al. |
| 2007/0214131 A1 | 9/2007 | Cucerzan et al. |
| 2007/0233653 A1 | 10/2007 | Biggs et al. |
| 2007/0255689 A1 | 11/2007 | Sun et al. |
| 2007/0260596 A1 | 11/2007 | Koran et al. |
| 2007/0260597 A1 | 11/2007 | Cramer et al. |
| 2007/0266021 A1 | 11/2007 | Aravamudan et al. |
| 2007/0266439 A1 | 11/2007 | Kraft |
| 2007/0288450 A1 | 12/2007 | Datta et al. |
| 2008/0010143 A1 | 1/2008 | Kniaz et al. |
| 2008/0027913 A1 | 1/2008 | Chang et al. |
| 2008/0052219 A1 | 2/2008 | Sandholm et al. |
| 2008/0052273 A1 | 2/2008 | Pickens |
| 2008/0059453 A1 | 3/2008 | Laderman |
| 2008/0077570 A1 | 3/2008 | Tang et al. |
| 2008/0082518 A1 | 4/2008 | Loftesness |
| 2008/0091650 A1 | 4/2008 | Fontoura et al. |
| 2008/0104043 A1 | 5/2008 | Garg et al. |
| 2008/0114624 A1 | 5/2008 | Kitts |
| 2008/0114729 A1 | 5/2008 | Raman et al. |
| 2008/0114750 A1 | 5/2008 | Saxena et al. |
| 2008/0140699 A1 | 6/2008 | Jones et al. |
| 2008/0162475 A1 | 7/2008 | Meggs et al. |
| 2008/0183660 A1 | 7/2008 | Szulcewski |
| 2008/0189269 A1 | 8/2008 | Olsen |
| 2008/0228442 A1 | 9/2008 | Lippincott et al. |
| 2008/0256050 A1 | 10/2008 | Zhang et al. |
| 2008/0313168 A1 | 12/2008 | Liu et al. |
| 2008/0313247 A1 | 12/2008 | Galvin |
| 2009/0012969 A1 | 1/2009 | Rail et al. |
| 2009/0055392 A1 | 2/2009 | Gupta et al. |
| 2009/0070194 A1 | 3/2009 | Song |
| 2009/0157643 A1 | 6/2009 | Gollapudi et al. |
| 2009/0182723 A1 | 7/2009 | Shnitko et al. |
| 2009/0228442 A1 | 9/2009 | Adams et al. |
| 2009/0287656 A1 | 11/2009 | Bennett |
| 2010/0106706 A1 | 4/2010 | Rorex et al. |
| 2010/0131563 A1 | 5/2010 | Yin |
| 2010/0205541 A1* | 8/2010 | Rapaport et al. ............. 715/753 |
| 2010/0228738 A1 | 9/2010 | Mehta et al. |
| 2010/0241472 A1 | 9/2010 | Hernandez |
| 2011/0219025 A1 | 9/2011 | Lipson et al. |
| 2011/0282906 A1 | 11/2011 | Wong |
| 2011/0295844 A1 | 12/2011 | Sun et al. |
| 2011/0295879 A1 | 12/2011 | Logis et al. |
| 2012/0011148 A1 | 1/2012 | Rathus et al. |
| 2012/0191705 A1 | 7/2012 | Tong et al. |

OTHER PUBLICATIONS

Agichtein, et al; *Learning User Interaction Models for Predicting Web Search Result Performances*; Aug. 2006; Proceedings of the Twenty-Ninth Annual International ACM SIGIR Conference on Research and Development in Information Retrieval, p. 3-10.

Bar-Llan et al., "Presentation Bias is Significant in Determining User Preference for Search Results—A User Study"; Journal of the American Society for Information Science and Technology, vol. 60, Issue 1 (p. 135-149), Sep. 2008, 15 pages.

Bar-Llan et al.; "Methods for comparing rankings of search engine results"; Computer Networks: The International Journal of Computer and Telecommunications Networking, Jul. 2006, vol. 50, Issue 10, 19 pages.

Boldi, et al.; *The Query-flow Graph: Model and Applications*; CKIM '08, Oct. 26-30, Napa Valley, California, USA, pp. 609-617.

Boyan et al.; *A Machine Learning Architecture for Optimizing Web Search Engines*; Aug. 1996; Internet-based information systems—Workshop Technical Report—American Association for Artificial Intelligence, p. 1-8.

Burke, Robin, Integrating Knowledge-based and Collaborative-filtering Recommender Systems, AAAI Technical Report WS-99-01. Compilation copyright © 1999, AAAI (www.aaai.org), pp. 69-72.

Craswell, et al.; *Random Walks on the Click Graph*; Jul. 2007; SIGIR '07, Amsterdam, the Netherlands, 8 pages.

Cutrell, et al.; *Eye tracking in MSN Search: Investigating snippet length, target position and task types*; 2007; Conference on Human Factors in Computing Systems—Proceedings of the SIGCHI Conference on Human Factors in Computing Systems.

Diligenti, et al., *Users, Queries and Documents: A Unified Representation for Web Mining*, wi-iat, vol. 1, 2009 IEEE/WIC/ACM International Joint Conference on Web Intelligence and Intelligent Agent Technology, 2009, pp. 238-244.

Hofmann, Thomas, *Latent Semantic Models for Collaborative Filtering*, ACM Transactions on Information Systems, vol. 22, No. 1, Jan. 2004, pp. 89-115.

Google News archive, Jul. 8, 2003, Webmasterworld.com, [online] Retrieved from the Internet http://www.webmasterwolrd.com/forum3/15085.htm [retrieved on Nov. 20, 2009] 3 pages.

Grečar, Miha, *User Profiling: Collaborative Filtering*, SIKDD 2004, Oct. 12-15, 2004, Ljubljana, Slovenia, 4 pages.

Joachims, T., Evaluating retrieval performance using clickthrough data. Proceedings of the SIGIR Workshop on Mathematical/Formal Methods in Information Retrieval; Aug. 12-15, 2002; Tampere, Finland, 18 pages.

Joachims; *Optimizing search engines using clickthrough data*; 2002; Proceedings of the ACM SIGKDD International Conference on Knowledge Discovery and Data Mining, p. 133-142.

Joachims et al., "Search Engines that Learn from Implicit Feedback"; Aug. 2007, IEEE Computer Society.

Kelly, et al.; *Implicit Feedback for Inferring User Preference: A Bibliography*; SIGIR Forum, vol. 37, No. 2 (2003), pp. 18-28.

Linden, Greg et al., Amazon.com *Recommendations: Item-to-Item Collaborative Filtering*, [online], http://computer.org/internet/, IEEE Internet Computing, Jan.-Feb. 2003, IEEE Computer Society, pp. 76-80.

U.S. Patent Office, U.S. Appl. No. 11/556,143, filed Nov. 2, 2006, in Office Action mailed Jan. 25, 2010, 14 pages.

U.S. Patent Office, U.S. Appl. No. 11/556,143, filed Nov. 2, 2006, in Office Action mailed Jul. 6, 2010, 20 pages.

(56) References Cited

OTHER PUBLICATIONS

U.S. Patent Office, U.S. Appl. No. 11/556,143, filed Nov. 2, 2006, in Office Action mailed Apr. 20, 2011, 18 pages.
Nicole, Kristen, *Heeii is StumbleUpon Plus Google Suggestions,* [online], Retrieved from the Internet http://mashable.com/2007/05/15/heeii/, 11 pages.
Lemire, Daniel, *Scale and Translation Invariant Collaborative Filtering Systems,* Published in Information Retrieval, 8(1), pp. 129-150, 2005.
U.S. Patent Office, U.S. Appl. No. 11/685,095, filed Mar. 12, 2007, in Office Action mailed Feb. 8, 2010, 31 pages.
U.S. Patent Office, U.S. Appl. No. 11/685,095, filed Mar. 12, 2007, in Office Action mailed Feb. 25, 2009, 21 pages.
U.S. Patent Office, U.S. Appl. No. 11/685,095, filed Mar. 12, 2007, in Office Action mailed Sep. 10, 2009, 23 pages.
U.S. Patent Office, U.S. Appl. No. 11/685,095, filed Mar. 12, 2007, in Office Action mailed Apr. 13, 2011, 31 pages.
Radlinski, et al., *Query Chains: Learning to Rank from Implicit Feedback,* KDD '05, Aug. 21-24, 2005, Chicago, Illinois, USA, 10 pages.
U.S. Patent Office, U.S. Appl. No. 11/556,086, filed Nov. 2, 2006, in Office Action mailed Jun. 23, 2010, 21 pages.
Schwab, et al., *Adaptivity through Unobstrusive Learning,* 2002, 16(3), pp. 5-9.
Stoilova, Lubomira et al., *GiveALink: Mining a Semantic Network of Bookmarks for Web Search and Recommendation,* LinkKDD '05, Aug. 21, 2005, Chicago, IL, USA, 8 pages.
W3C, URIs, URLs and URNs: Classification and Recommendations 1.0, Report from the joint W3C/IETF URI Planning Interest Group, Sep. 21, 2001, 8 pages.
Xiao, et al., *Measuring Similarity of Interests for Clustering Web-Users,* ADC, 2001, pp. 107-114.
Xie et al., *Web User Clustering from Access Log Using Belief Function,* K-Cap '01, Oct. 22-23, 2001, Victoria, British Columbia, Canada, pp. 202-208.
Yu et al., *Selecting Relevant Instances for Efficient and Accurate Collaborative Filtering,* CIKM '01, Nov. 5-10, 2001, Atlanta, Georgia, pp. 239-246.
Zeng et al., *Similarity Measure and Instance Selection for Collaborative Filtering,* WWW '03, May 20-24, 2003, Budapest, Hungary, pp. 652-658.
Zeng, et al., "Learning to Cluster Web Search Results", SIGIR '04, Proceedings of the 27th Annual International ACM SIGIR conference on research and development in information retrieval, 2004.
Soumen Chakrabarti, et al. "Enhanced Topic Distillation using Text, Markup tags, and Hyperlinks". ACM 2001, pp. 208-216.
Gabriel Somlo et al., "Using Web Hepler Agent Profiles in Query Generation", ACM, Jul. 2003, pp. 812-818.
Australian Patent Office Non-Final Office Action in AU App. Ser. No. 2004275274, mailed Feb. 3, 2010, 2 pages.
Dan Olsen et al., "Query-by-critique: Spoken Language Access to Large Lists", ACM, Oct. 2002, pp. 131-140.
Susan Gauch et al., "A Corpus Analysis Approach for Automatic Query Expansion and its Extension to Multiple Databases", ACM, 1999, pp. 250-269.
Nicolas Bruno et al., "Top-K Selection Queries over Relational Databases: Mapping Strategies and Performance Evaluation", ACM, Jun. 2002, pp. 153-187.
Ji-Rong Wen et al., "Query Clustering using User Logs", ACM, Jan. 2002, pp. 59-81.
Brin, S. and L. Page, The Anatomy of a Large-Scale Hypertextual Web Search Engine, Computer Science Department, 1998.
International Search Report and Written Opinion for Application No. PCT/US2004/029615, dated Jan. 19, 2005, 8 pages.
Hungarian Patent Office, International Search Report and Written Opinion for Application No. 200806756-3, dated Nov. 19, 2010 12 pages.
International Preliminary Report and Written Opinion for Application No. PCT/US2004/029615, mailed Mar. 23, 2006.
Indian Office Action in Indian Application No. 686/KOLNP/2006, mailed Jun. 3, 2008, 2 pages.
Danish Search Report and Written Opinion for Application No. 200601630-7, dated Jun. 21, 2007, 15 pages.
Joachims, "Evaluating Search Engines Using Clickthrough Data", Cornell University, Department of Computer Science, Draft, Feb. 19, 2002, 13 pages.
Jansen et al., "An Analysis of Web Documents Retrieved and Viewed", School of Information Sciences and Technology, The Pennsylvania State University, the 4th International Conference on Internet Computing, Las Vegas, Nevada, pp. 65-69, Jun. 23-26, 2003, 5 pages.
Jones et al., "Pictures of Relevance: A Geometric Analysis of Similarity Measures", Journal of the American Society for Information Science, Nov. 1987, 23 pages.
Kaplan et al., "Adaptive Hypertext Navigation Based on User Goals and Context", User Modeling and User-Adapted Interaction 2, Sep. 1, 1993; pp. 193-220, 28 pages.
Liddy et al., "A Natural Language Text Retrieval System With Relevance Feedback", 16th National Online, May 2-6, 1995, 3 pages.

\* cited by examiner

COMBINING USER FEEDBACK

BACKGROUND

This specification relates to digital data processing and, in particular, to ranking of search results.

Internet search engines provide information about Internet accessible resources (e.g., web pages, images, electronic books, text documents, sounds, music, videos, electronic games, and multimedia content) by returning search results in response to queries. A search result includes, for example, a Uniform Resource Locator (URL) and a snippet of information for resources responsive to a query. The search results can be ranked (i.e., put in an order) according to scores assigned to the search results by a scoring function. The scoring function ranks the search results according to various signals, for example, where (and how often) query terms appear in the search results and how common the query terms are in the search results indexed by the search engine.

SUMMARY

This specification relates to digital data processing and, in particular, to combining user feedback.

Particular embodiments of the subject matter described in this specification can be implemented so as to realize one or more of the following advantages. The quality of search results may be improved. Quality metrics from one search engine may be used to improve the ranking of search results for another search engine. Fresh content from video property could get chance to surface on web search engine which serves large volume of pages from variety of properties. The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
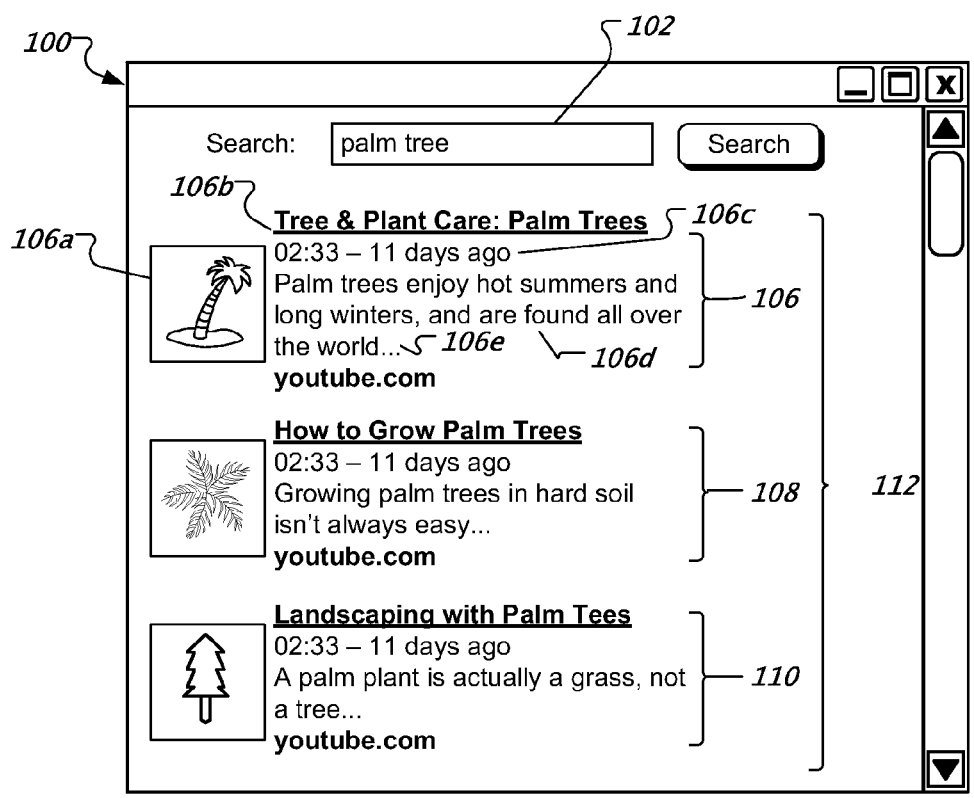
FIG. 1 illustrates an example of video search results displayed in a web page presented in a web browser.

FIG. 1 illustrates an example of video search results displayed in a web page 100 presented in a web browser or other software application. The web page 100 includes a text entry field 102 which accepts queries from users. A query is submitted by a user and specifies general or specific topics of interest to the user. A query may be in the form of text (e.g. "palm tree") or a spoken word or phrase, for example. Queries can also comprise images or videos. A submitted query is transmitted to a search engine. The search engine identifies videos in an index of resources that are responsive to the query. The search engine transmits search results 106, 108 and 110 that reference the identified videos to the web browser for presentation in region 112 of the web page 100.

Each search result can include summary information such as a representative frame from the video (e.g., frame 106a), the video's title (e.g., title 106b), a textual summary (e.g., synopsis 106d), the running time of the video (e.g., time data 106c), and a Uniform Resource Locator (URL) or other identifier specifying the location of the video (e.g., identifier 106e). In some implementations, time data 106c includes the duration of the video and the date on which the video was uploaded. Other search result information is possible. A video may be stored at the location (e.g., identifier 106e) in a portion of a file that holds other content, in a single file dedicated to the video in question, or in multiple coordinated files. A video may, but need not, correspond to a file. A user can select a search result (e.g., frame 106a or identifier 106e) with a mouse click, a finger gesture on a touch-sensitive surface, a speech command to a microphone, or by way of another input device, for example, in order to view the video identified by the search result.

Search results 112 can be ranked according to traditional techniques for determining an information retrieval (IR) score for indexed resources in view of a given query, for example. The relevance of a particular resource with respect to a particular search term or other provided information may be determined by any appropriate scoring technique. The score of the resource can be modified based on prior interactions of users with the resource in view of the given query.

Figure 2:
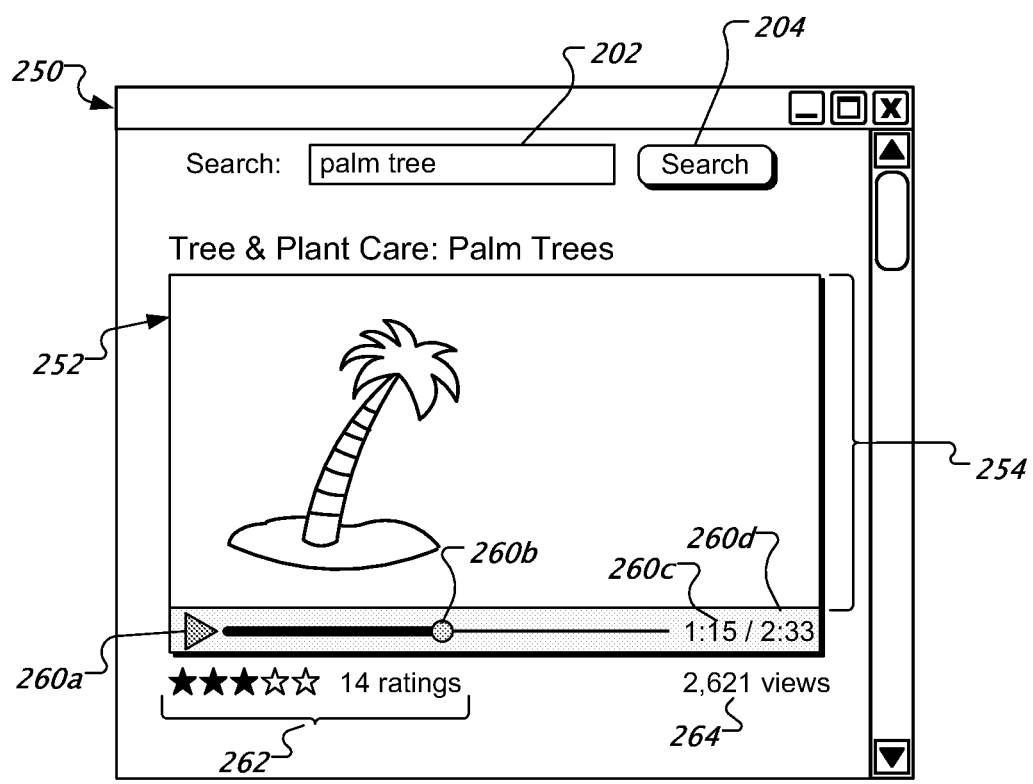
FIG. 2 illustrates an exemplary video player as displayed in a web page presented in a web browser or other software application.

FIG. 2 illustrates an exemplary video player as displayed in a web page 250 presented in a web browser or other software application. In some implementations, the video player is a stand-alone software application. The video player includes a playback window 252 for displaying a video. Different video formats are supported including, but not limited to, HD, HDV, DVD, Blu-Ray, HD-DVD, HD-VMD, CH-DVD, HDTV, Adobe Systems Incorporated FLASH, MPEG, MPEG-4, and Apple Inc. QUICKTIME. A play button 260a starts and pauses the video playback while a progress bar indicator 260b indicates how much of the video has been played. The current time offset into the playback or ("watch time") is displayed at 260c and the total running time of the video is displayed at 260d. In this illustration, the watch time is 1 minute and 15 seconds, and the total running time is 2 minutes and 33 seconds. A rating 262 indicates the average rating (e.g., three out of five stars) of all user ratings of the video and the total number of ratings (e.g., fourteen). By way of illustration, a video rating system can have rating values of one, two, three, four or five stars, with one star indicating strong dislike and five stars indicating strong enjoyment on the part of the user rating the video. Other rating systems are possible, however. The total number of users who have viewed the video (or "view count") 264 in part or in its entirety is also presented.

In various implementations, a system described below with reference to FIG. 3 maintains user feedback data including user ratings, watch times, view counts, and other data. User interactions with a video are logged. For example, the amount of time a user plays the video is logged as a watch time for the video. In some implementations, the watch time is the total time the user spent watching the video before navigating off of the web page. The watch time can be unaffected by whether the user watched portions of the video out of sequence or skipped portions. If the watch time for a video is not known (e.g., because the video is not hosted by a system that keeps track of user watch times), the watch time can be estimated based on when users navigate off of the web page for the video. For example, a web browser plug-in or other software can monitor when users navigate off of web pages and record this information. If the system hosting the video does not programmatically provide a view count for the video (e.g., through an application programming interface), the view count can be detected by a plug-in or other software that analyzes the web page for text indicating the view count.

User feedback data can also include user interaction counts, targeted interaction counts, and impression counts. As used herein, a user interaction represents users' selections (e.g., clicks with a mouse) of search results that reference resources (e.g., videos or web pages). A targeted interaction represents a user interaction where the time duration the user interacts with the resource referred to by selected search result satisfies a threshold (e.g., the time duration is greater than a threshold or less than a threshold). For example, for videos a targeted interaction can be a user interaction where the watch time exceeds a threshold (e.g., one minute). For a web page, targeted interactions can be user interactions where a period of time beginning when a user selects a search result from a search web page and ending when the user returns to the search web page exceeds a threshold (e.g., thirty seconds, one minute, two minutes, five minutes). An impression is a presentation of a search result that references a resource. In some implementations, an impression is limited to presentations of a search result identifying the resource where the search result is ranked among the top search results for the query (e.g. in the top twenty search results, on the first page of search results).

Several quality metrics may be determined based on user interactions and targeted interactions. For example, the number of targeted interactions for a resource may be divided by the number of impressions of the resource. Another quality metric may be calculated by dividing the count of the number of targeted interactions for the resource by the number of targeted interactions with any resource responsive to the query. Examples of quality metrics include a traditional quality metric, a targeted interaction quality metric, and an impressions quality metric.

The traditional quality metric is described by the formula:

$$TQM = TI_i / \Sigma TI$$

Where the TQM represents a traditional quality metric. $TI_i$ is the number of targeted interactions for a particular resource responsive to a query. TI is a targeted interaction for any resource responsive to the same query.

The targeted interaction quality metric is described by the formula:

$$TIQM = TI / I$$

Where the TiQM represents the Targeted Interactions Quality Metric, TI is the number of targeted interactions for a particular resource. I is the number of user interactions with the resource.

The impression quality metric is described by the formula:

$$IMPQM = TI / IMP$$

Where IMPQM represents the impressions quality metric, TI is the number of targeted interactions for a particular resource. IMP is the number of impressions of the resource.

Figure 3:
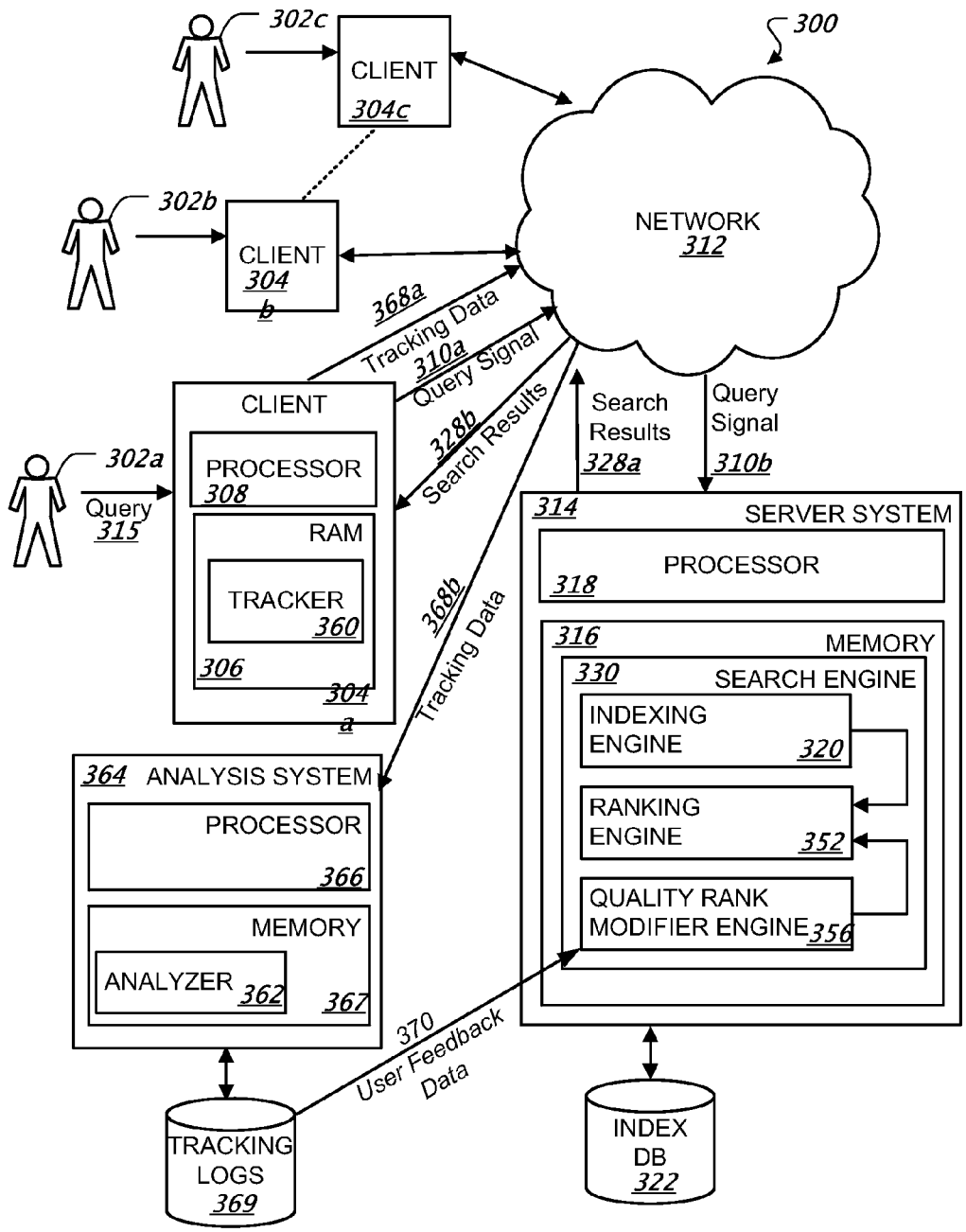
FIG. 3 illustrates an example search system for identifying search results in response to search queries.

FIG. 3 illustrates an exemplary search system 300 for identifying search results in response to search queries as can be implemented in an Internet, intranet, or other client/server environment. The system 300 is an example of a search system in which the systems, components and techniques described herein can be implemented. Although several components are illustrated, there may be fewer or more components in the system 300. Moreover, the components can be distributed on one or more computing devices connected by one or more networks or other suitable communication mediums.

A user 302 (302a, 302b, 302c) interacts with the system 300 through a client device 304 (304a, 304b, 304c) or other device. For example, the client device 304 can be a computer terminal within a local area network (LAN) or wide area network (WAN). The client device 304 generally includes a random access memory (RAM) 306 (or other memory and/or a storage device) and a processor 308. The processor 308 is structured to process instructions on the client device 304. The processor 308 is a single or multi-threaded processor having one or more processor cores, for example. The processor 308 is structured to process instructions stored in the RAM 306 (or other memory and/or a storage device included with the client device 304) to display graphical information for a user interface.

The RAM 306 on the client device 304 includes a tracker software program 360 for keeping track of user interactions and targeted interactions. For example, in the case of video resources, the tracker program can maintain a count of views, watch times, and user ratings of videos on the client device 304. The tracker 360 can send the tracked data as a client-side signal 368a into the network 312 (e.g., the Internet or other network). The data is forwarded to an analysis system 364 as a signal 368b. The analysis system 364 generally includes a RAM 367 (or other memory and/or a storage device) and a processor 366. The processor 366 is structured to process instructions on the analysis system 364. The processor 366 is a single or multi-threaded processor having one or more processor cores, for example. The RAM 367 includes an analyzer software program 362 for analyzing the tracking data 368b in order to derive or update predictor and voting functions. The tracking data 368b can be stored in one or more tracking logs 369 which are used to record the collected information for multiple users and resources. In various implementations, the recorded information includes log entries that indicate the IP (Internet Protocol) address of the client 304 which transmitted the information, the type of data (e.g., view count, watch time, user rating, time durations for targeted interactions), and a value for the data.

A user 302a connects to the search engine 330 within a server system 314 to submit a query. When the user 302a submits the query through an input device attached to a client device 304a, a client-side query signal 310a is sent into the network 312 and is forwarded to the server system 314 as a server-side query signal 310b. Server system 314 can be one or more server devices in one or more locations. A server system 314 includes a memory device 316, which can include the search engine 330 loaded therein. A processor 318 is structured to process instructions within the device 314. These instructions can implement one or more components of the search engine 330. The processor 318 can be a single or multi-threaded processor and can include multiple processing cores. The processor 318 can process instructions stored in the memory 316 related to the search engine 330 and can send information to the client devices 304a-c, through the network 312, to create a graphical presentation in a user interface of the client device 304 (e.g., a search results web page displayed in a web browser).

The server-side query signal 310b is received by the search engine 330. The search engine 330 uses the information within the user query (e.g. query terms) to find relevant resources (e.g., web pages, videos). The search engine 330 can include an indexing engine 320 that actively searches a corpus (e.g., web pages on the Internet) to index the resources found in that corpus, and the index information for the resources in the corpus can be stored in an index database 322. This index database 322 can be accessed to identify resources related to the user query. Note that a resource does not necessarily correspond to a file. A resource can be stored in a portion of a file that holds other resources, in a single file dedicated to the resource in question, or in multiple coordinated files. Moreover, a resource can be stored in a memory without having first been stored in a file.

The search engine 330 includes a ranking engine 352 to rank the resources related to the user query using a scoring or ranking algorithm. The ranking of the resources can be performed using traditional techniques for determining an information retrieval (IR) score for indexed resources in view of a given query, for example. The relevance of a particular resource with respect to a particular search term or to other provided information may be determined by any appropriate technique.

To further improve such traditional resource ranking techniques, the ranking engine 352 receives quality signals from a quality rank modifier engine 356 to assist in determining an appropriate ranking for search results. As discussed above, in some implementations, the quality rank modifier engine 356 calculates the quality signal using a quality metric calculated from user feedback data 370 stored in tracking logs 369.

The search engine 330 forwards the final, ranked result list within a server-side search results signal 328a through the network 312. Exiting the network 312, a client-side search results signal 328b is received by the client device 304a where the results are stored within the RAM 306 and/or used by the processor 308 to display the results on an output device for the user 302a. The server system 314 may also maintain one or more user search histories based on the queries it receives from a user and which results that a user selected after a search was performed.

Figure 4:
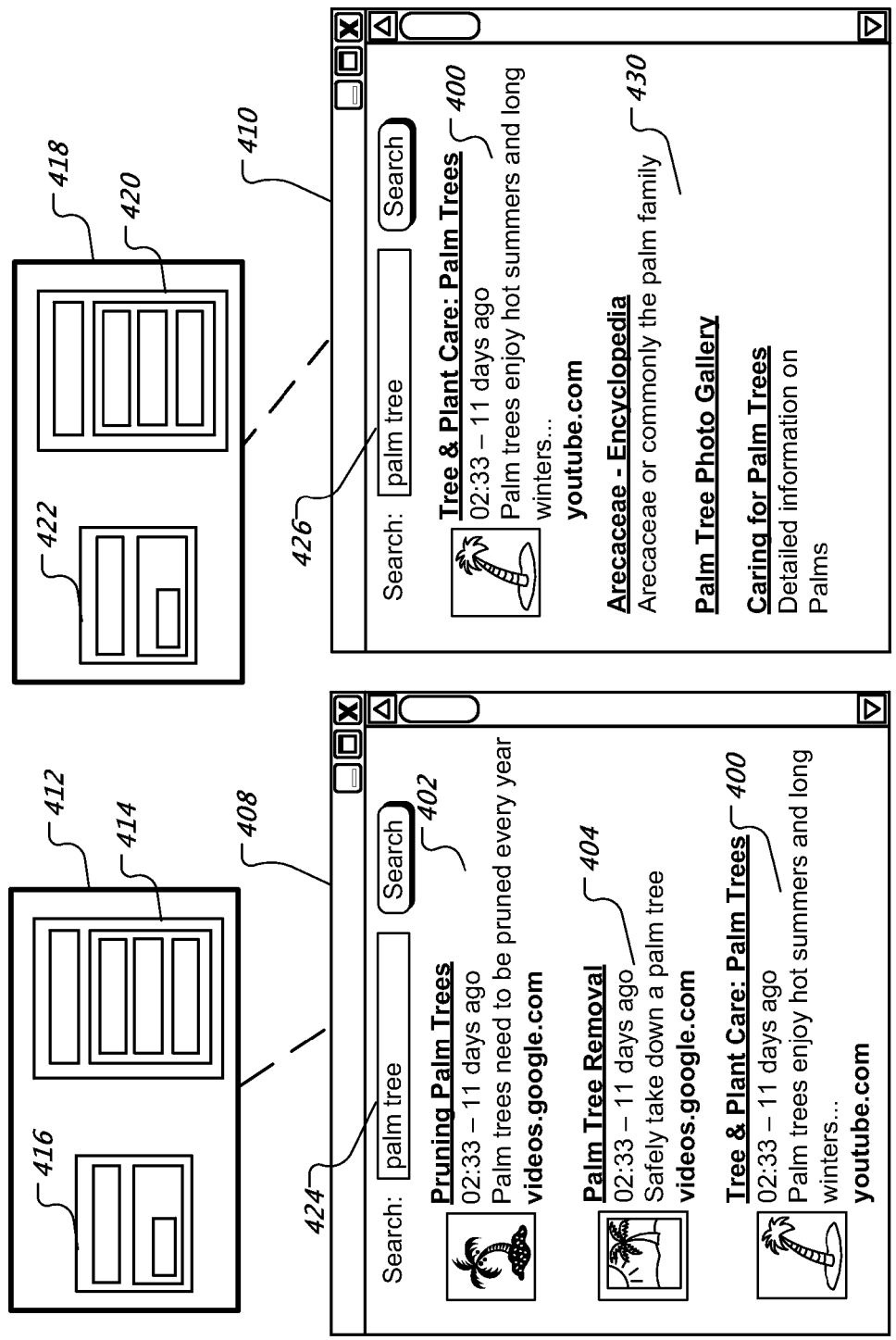
FIG. 4 is a diagram illustrating example user interfaces for search systems.

FIG. 4 is a diagram illustrating example user interfaces for search systems. In this example, a first user interface 408 is provided by a video search system 412, the video search system may include a server system 414, for example, the server system 314 of FIG. 3, and an analyzer system 416, for example, the analyzer system 364 of FIG. 3. A second user interface 410 is provided by a web search system 418. The web (or "universal") search system 418 includes a server system 420 and an analyzer system 422.

In this example, the video search system 412 provides video search results "Palm Tree Removal" 404, "Pruning Palm Trees" 402, and "Tree & Plant Care: Palm Trees" 400 in response to receiving a query, "palm tree," as shown by the text in the search text area 424 on the user interface 408. The video search system provides links to the videos as part of the search results. Based on the ranking algorithm used by the first search system 412 and on user feedback data maintained by the analyzer system 416, "Pruning Palm Trees" 402 is displayed first (i.e., has the highest rank), "Palm Tree Removal" 404 is displayed second (i.e., has the second highest rank), and "Tree & Plant Care: Palm Trees" 400 is displayed third (i.e., has the third highest rank).

The web search system 418 provides a wider variety of resources as search results responsive to receiving the same query, "palm tree," as shown by the text entered into the search text area 426 on the user interface 410. The search results from the web search system include the video search result "Tree & Plant Care: Palm Trees" 400 in addition to links to assorted web pages and images 430.

Based on the ranking algorithm used by the second search system 420 and user feedback data maintained by the analyzer system 422, the search system 418 ranks "Tree & Plant Care Palm Trees" 400 highest.

The difference in the order of search results between the two search systems in this example is based, at least in part, on differences in the user feedback data in the video search system 412 and user feedback data in the web search system 418. These differences may be caused by many factors both legitimate and idiosyncratic. For example, typical users of the video search system may have different interests than typical users of the web search system. The video search system may be a less popular fall back search system when compared to the Web search system, therefore, many of the users who search on the video search system have already explored the videos provided in the Web search system. The video search system may have only a few users, therefore the preferences of a few individual may disproportionately affect the user feedback data when compared to a larger user population of the Web search system.

Figure 5:
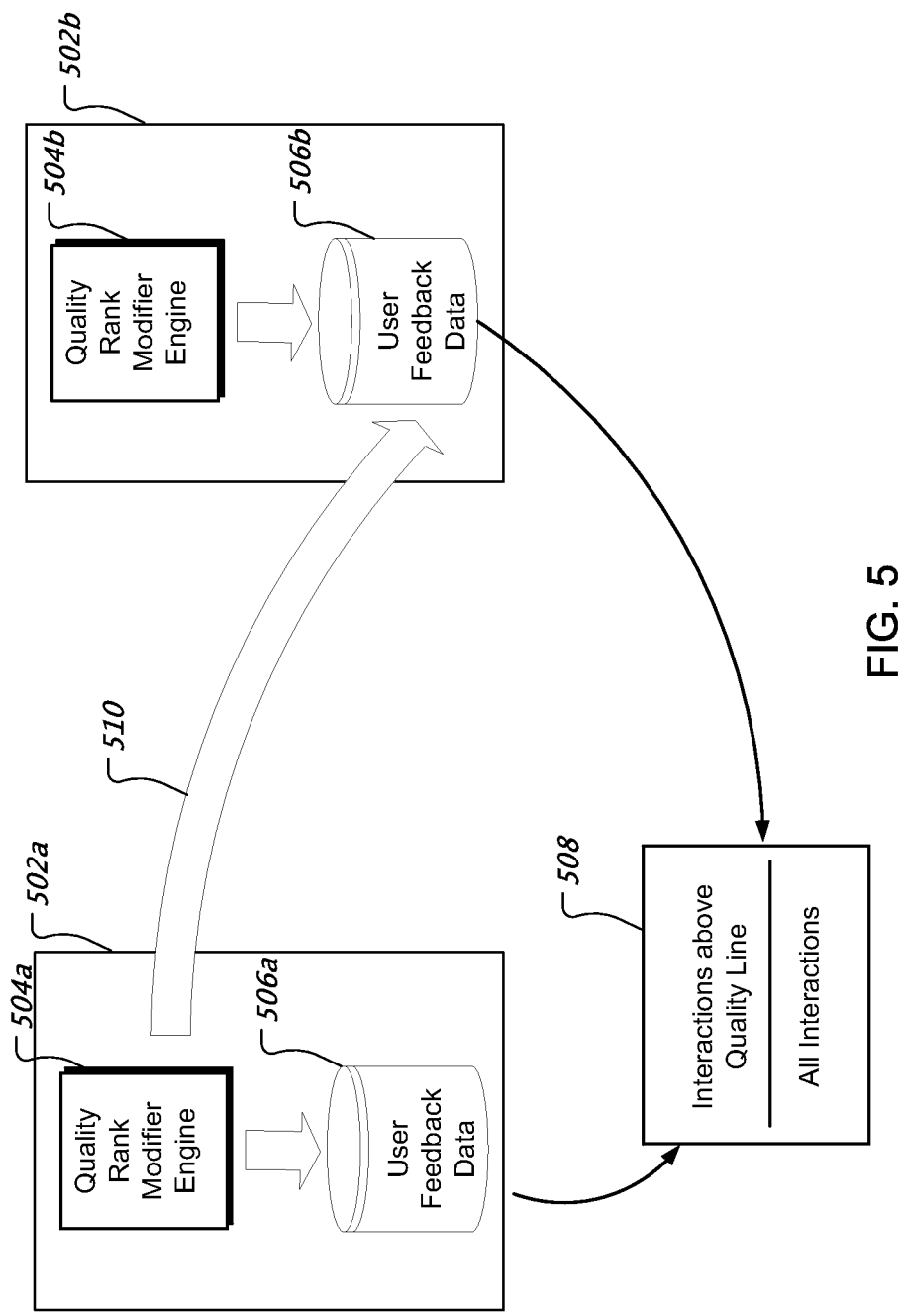
FIG. 5 illustrates a diagram of an example video search system utilizing user feedback data from a web search system.

FIG. 5 illustrates a diagram of an example video search system using the user feedback data from a Web search system. A video search system 502a contains a quality rank modifier engine 504a that references user feedback data 506a, referred to as primary user feedback data. The web search system 502b contains a quality rank modifier engine 504b that references a user feedback data 506b. Represented by process arrow 510, the video quality rank modifier engine 504a accesses the user feedback data 506b of the web search system 502b, as secondary user feedback.

Generally, primary user feedback data refers to user feedback data from the search system performing the ranking and secondary user feedback data refers to user feedback data taken from another search system. In some implementations, the quality rank modifier engine 504a combines primary user feedback data for a given video with the secondary user feedback data. The quality rank modifier engine creates a combined quality metric 508 from the combined user feedback data.

In some scenarios, the secondary user feedback data 506b may contain significantly more data than the primary user feedback data 506a. The difference in the quantity of user feedback data presents a risk of bias. The secondary user feedback data could dominate the combined quality metric 508. The unique interests of users of the primary video search system would be discounted. To prevent the secondary user feedback data from overwhelming the primary user feedback data, a weight is applied to the secondary user feedback data. The weight is based on the primary user feedback data and a smoothing factor. The smoothing factor identifies a threshold quantity of primary user feedback data. As the amount of primary user feedback data approaches the smoothing factor the weight of the secondary user feedback data decreases. When the primary user feedback data is equal to or greater than the smoothing factor, the secondary user feedback data no longer affects the combined quality metric. In this way, the smoothing factor provides a threshold quantity of primary user feedback data, above this threshold the secondary user feedback data is not used.

In some implementations, as an optimization, the combined quality metrics are not calculated when the quantity of primary user feedback data is greater than the smoothing factor.

In some implementations, the smoothing factor is selected to balance the risk of bias with the benefits of utilizing the secondary user feedback data. On the one hand, the users of the different systems have different preferences which should be respected. On the other hand, a small quantity of primary user feedback data allows individuals to skew video search results based on their idiosyncratic preferences. If the smoothing factor is too large then the secondary user feedback data can overwhelm the primary user feedback data, ignoring legitimate differences. If the smoothing factor is too small then the secondary user feedback data is underutilized, resulting in search results being skewed by the idiosyncrasies of a small number of users.

To achieve balance, the smoothing factor is based, in part, on the quality metric being calculated. For example, the smoothing factor for the traditional quality metric may be different from the smoothing factor for the targeted interactions quality metric. For example, when utilizing secondary feedback data from a video search system the smoothing factor for the traditional quality metric can be 25; the smoothing factor for the targeted interaction quality metric can be 10,000; and the smoothing factor for the impression quality metric can be 0. Other smoothing factors are possible.

The smoothing factor is also based, in part, on the source of the secondary user feedback data. For example, the smoothing factor applied to user feedback data from a general Web search system may be different from the smoothing factor applied to the user feedback data from a dedicated video search system. In some embodiments, the smoothing factor may be customized for specific video search systems. For example, when utilizing secondary feedback data from a general Web search system, the smoothing factor for the traditional quality metric can be 0. The smoothing factor for the targeted interaction quality metric may be 10,000. The smoothing factor for the impression quality metric can be 0. Other smoothing factors are possible.

In one implementation, user feedback data from search systems that have different ranking algorithms can be combined into a combined quality metric based on the following calculations.

Generally, the quality metrics are defined by the fraction $$\frac{n}{d}$$

where n represents a measure of targeted interactions with the resource and d represents a measure of a larger set of user feedback, for example, all user interactions with the resource, targeted interactions with any resource provided as a search result, or impressions of the resource.

In some implementations, the weight applied to the secondary user feedback data is determined based on the following formula;

$$\text{weight} = \min\left(1.0, \max\left(0.0, \frac{(\text{smooth} - d_1)}{d_2}\right)\right)$$

where weight represents the weight, smooth is the smoothing factor, $d_1$ is the size of the larger population of primary user feedback data and $d_2$ is the size of the larger population of secondary user feedback data. The function min calculates to the minimum value of two arguments, and max calculates to the maximum value of two arguments. By decreasing the weight as the larger population of primary user feedback data increases, the risk of bias is managed. Secondary user feedback data is only relied upon when insufficient primary user feedback data exists to exceed the smoothing factor.

In some implementations, the combined quality metric is calculated based on the following formula:

$$cqm = \frac{n_1 + \text{weight} * n_2}{d_1 + \text{weight} * d_2}$$

Where cqm is the combined quality metric, $n_1$ is the number of targeted interactions from the primary user feedback data, $n_2$ is the number of targeted interactions from the secondary user feedback data, weight is the calculated weight, d1 is the size of the larger population of primary user feedback data and d2 is the size of the larger population of secondary user feedback data.

Figure 6:
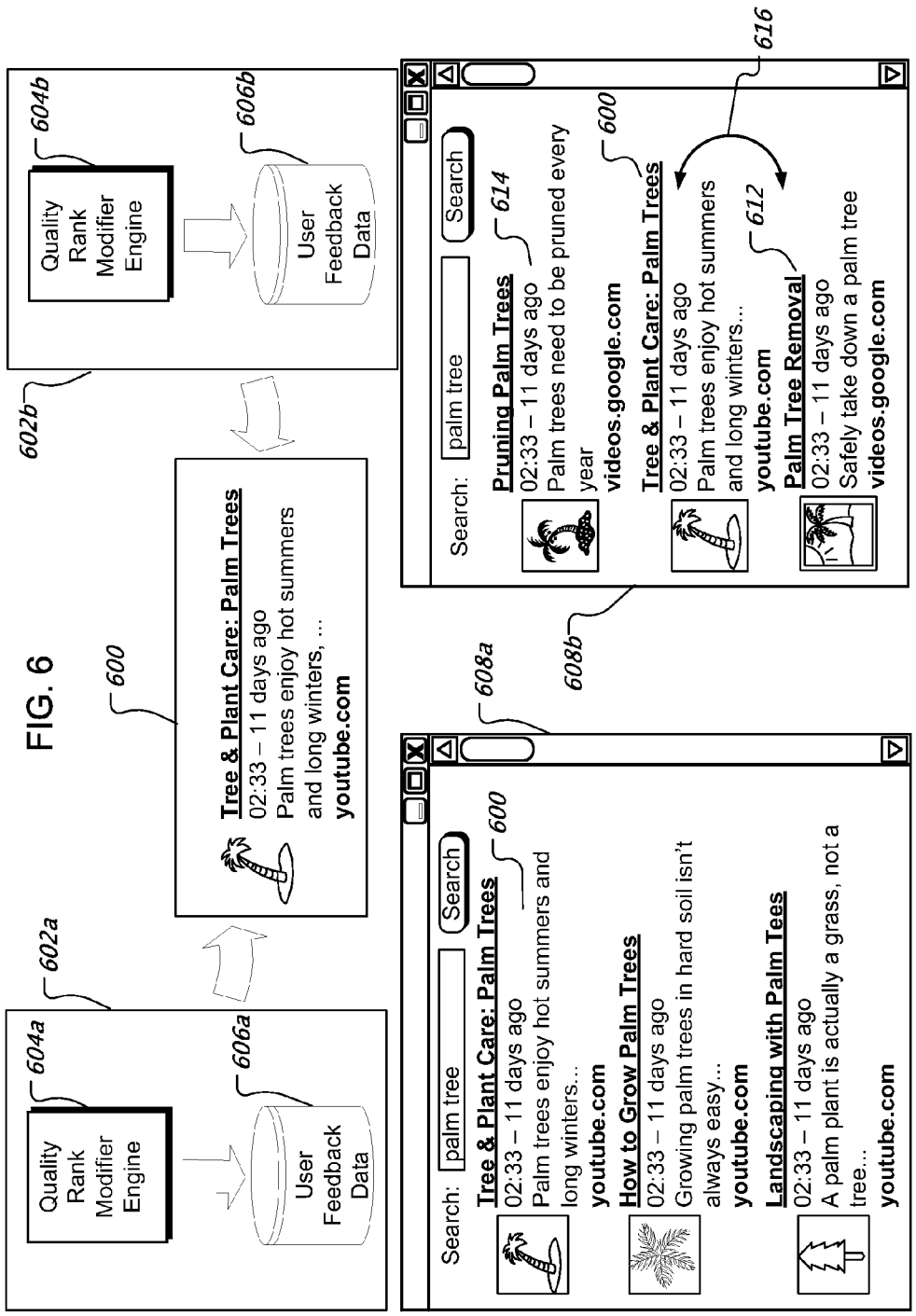
FIG. 6 illustrates example search result rankings being adjusted based on combined quality metrics.

FIG. 6 illustrates example search result rankings being adjusted based on combined quality metrics. A video, "Tree & Plant Care: Palm Trees" 600, is indexed by two different search systems 602a, 602b. Each search system maintains user feedback data. For example, a first search system 602a maintains first user feedback data in a data store 606a. Similarly, a second search system 602b maintains second user feedback data in a data store 606b. The quality rank modifier engine 604a for the first search system 602a uses first user feedback data 606a to adjust the ranking for search results. In this example, user interface 608a shows a search for "palm tree." The video, "Tree & Plant Care: Palm Trees" 600, appears at the top of the rankings. In second search system 602b, the quality rank modifier engine 604b uses the second user feedback data 606b combined with the first user feedback data 606a to adjust the ranking for search results. In this example, the first user feedback data affects the combined quality metrics for the "Tree & Plant Care: Palm Trees' video 600. As a result (as represented by the double arrow 616) the increase in the score attributable to the combined quality metric is sufficient to promote the "Tree & Plant Care: Palm Trees" video 600 ahead of the "Palm Tree Removal" video 612. However, the "Tree & Plant Care: Palm Trees" video 600 remains below the "Pruning Palm Trees" video 614.

Figure 7:
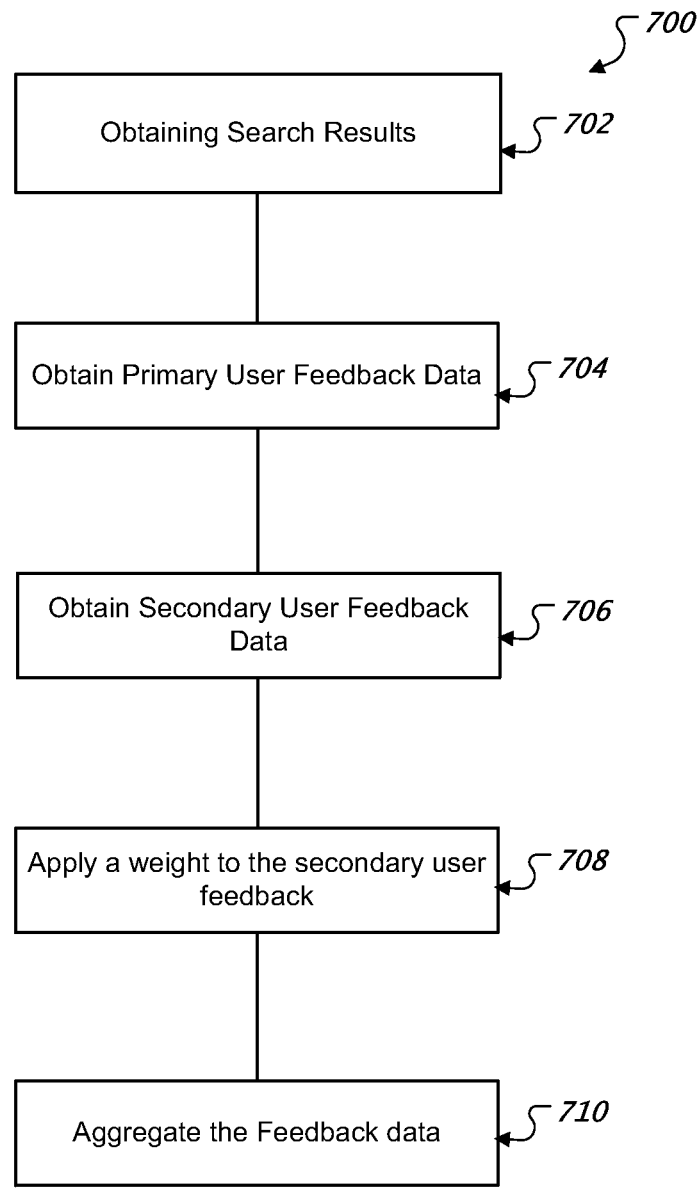
FIG. 7 is a flowchart illustrating an example process for combining user feedback.

FIG. 7 is a flowchart illustrating an example process for combining user feedback. The example process 700 may be implemented by a quality rank modifier engine, for example the quality rank modifier engine 356 of FIG. 3.

The process obtains search results (702). Search results may be obtained from a search system, for example the index engine 320 of FIG. 3. In general, search results are obtained which are responsive to a query. The search results are provided a score based on a ranking algorithm.

The process obtains primary user feedback data (704). The primary user feedback data represents interactions previous users of the system have had with the search result. For example, the primary user feedback data may include the number of targeted interactions, the number of user interactions, and the number of impressions. The primary user feedback data may also include user feedback data for other videos, for example, the number of targeted interactions for any video responsive to the query.

The process obtains secondary user feedback data (706). The secondary user feedback data is user feedback data provided from a second search system. The secondary user feedback data represents interactions previous users of the second search system have had with the search result. For example, the secondary user feedback data may include the number of targeted interactions, the number of user interactions, and the number of impressions. The secondary user feedback data may also include user feedback data for other videos, for example, the number of targeted interactions for any video responsive to the query.

The process applies a weight to the secondary user feedback (708). The weight applied to the secondary user feedback may be determined based on a smoothing factor, the primary user feedback data, and the secondary user feedback data. In general, the larger the sample size of primary user feedback the smaller the weight applied to the secondary user feedback. For example, if the primary user feedback data contains a small sample set the secondary user feedback has greater weight than if the primary user feedback contains a larger sample set.

The process aggregates the primary and secondary user feedback data (710). The process calculates combined user feedback data based on the primary user feedback data, the secondary user feedback data and the weight.

Figure 8:
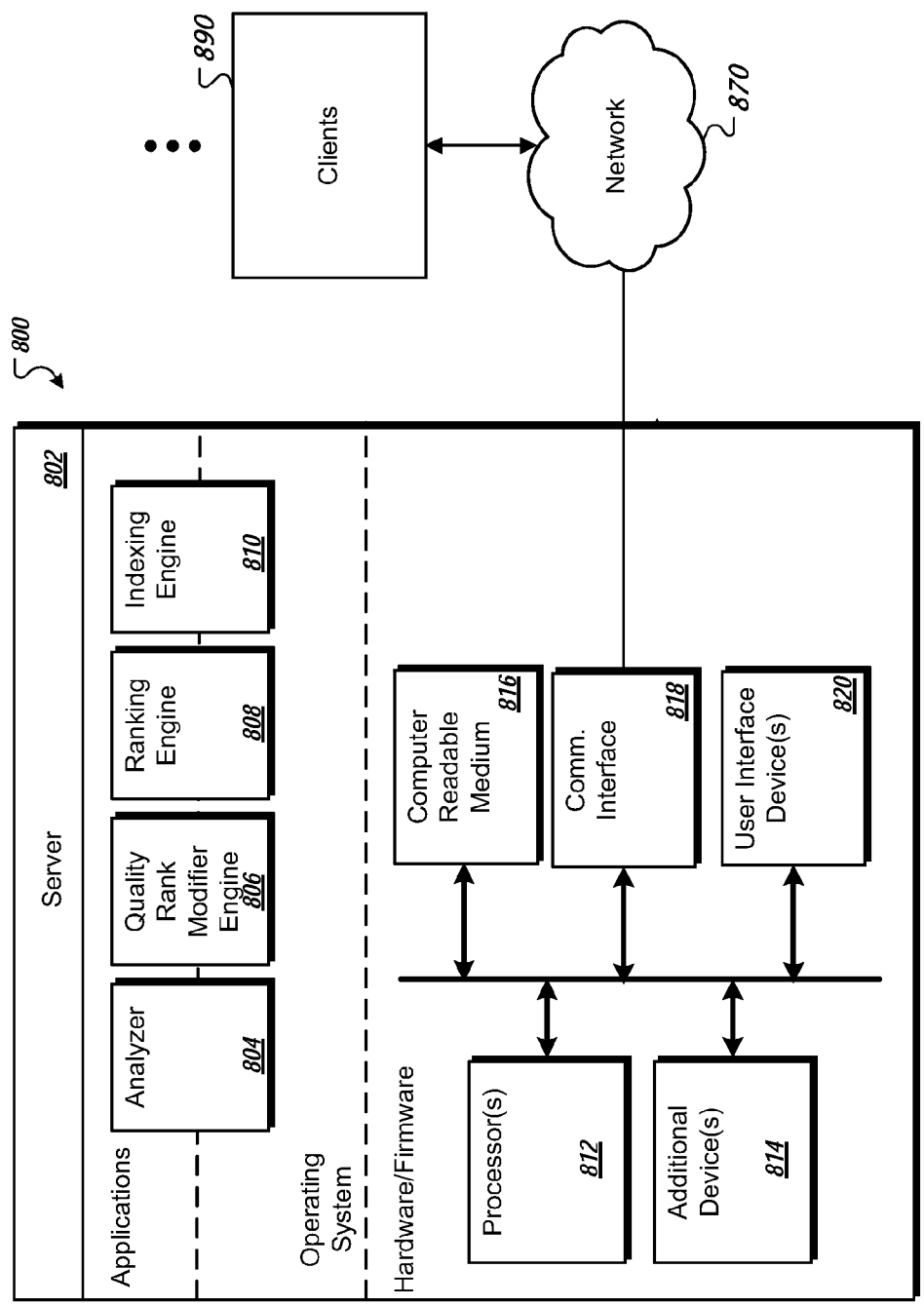
FIG. 8 is a schematic diagram of an example system configured to derive a combined quality metric.

FIG. 8 is a schematic diagram of an example system configured to derive a combined quality metric. The system generally consists of a server 802. The server 802 is optionally connected to one or more user or client computers 890 through a network 870. The server 802 consists of one or more data processing apparatuses. While only one data processing apparatus is shown in FIG. 94, multiple data processing apparatus can be used. The server 802 includes various modules, e.g. executable software programs, including an analyzer 804 for analyzing the tracking data in order to derive or update predictor and voting functions. A quality rank modifier 806 is configured to calculate the quality metrics of a video on the fly using the predictor and voting functions derived by the analyzer 804. Alternatively, the quality metrics can be calculated for videos ahead of time so that the quality rank modifier engine 806 only needs to look up the value for a given video. A ranking engine 808 ranks videos responsive to a query which were identified using one or more indexes maintained by the indexing engine 810. The ranking engine 808 can use the quality signal provided by the quality signal engine 806 as an additional input to is ranking algorithm.

Each module runs as part of the operating system on the server 802, runs as an application on the server 802, or runs as part of the operating system and part of an application on the server 802, for instance. Although several software modules are illustrated, there may be fewer or more software modules. Moreover, the software modules can be distributed on one or more data processing apparatus connected by one or more networks or other suitable communication mediums.

The server 802 also includes hardware or firmware devices including one or more processors 812, one or more additional devices 814, a computer readable medium 816, a communication interface 818, and one or more user interface devices 820. Each processor 812 is capable of processing instructions for execution within the server 802. In some implementations, the processor 812 is a single or multi-threaded processor. Each processor 812 is capable of processing instructions stored on the computer readable medium 816 or on a storage device such as one of the additional devices 814. The server 802 uses its communication interface 818 to communicate with one or more computers 890, for example, over a network 870. Examples of user interface devices 820 include a display, a camera, a speaker, a microphone, a tactile feedback device, a keyboard, and a mouse. The server 802 can store instructions that implement operations associated with the modules described above, for example, on the computer readable medium 816 or one or more additional devices 814, for example, one or more of a floppy disk device, a hard disk device, an optical disk device, or a tape device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
obtaining search results responsive to a query, each search result identifying a respective resource and each resource having a respective rank determined by a primary ranking algorithm;
for one or more of the respective resources:
obtaining primary user feedback data for the resource, the primary user feedback data representing a plurality of previous user interactions with the resource when the resource was presented as a search result responsive to the query and wherein the search result had a rank determined by the primary ranking algorithm;
obtaining secondary user feedback data for the resource, the secondary user feedback data representing a plurality of previous user interactions with the resource when the resource was presented as a search result responsive to the query and wherein the search result had a rank determined by a different secondary ranking algorithm;

applying a weight to the secondary user feedback data, the weight being at least partially based on a threshold quantity of the primary user feedback data;

aggregating the primary user feedback data and the weighted secondary user feedback data and modifying the respective rank of the resource as a search result for the query based at least partially on the aggregated data; and wherein obtaining, applying and aggregating are performed by one or more data processing apparatus.

2. The method of claim 1, wherein the primary user feedback data includes a first plurality of user interactions where the duration of each of the user interactions in the first plurality satisfies a first threshold; and in which the secondary user feedback data includes a second plurality of user interactions where the duration of each of the user interactions in the second plurality satisfies a second threshold.

3. The method of claim 2, wherein the weight is further based on a count of user interactions in the primary user feedback data and a count of user interactions in the secondary user feedback data.

4. The method of claim 3, wherein the weight is inversely proportional to the count of user interactions in the secondary user feedback data.

5. The method of claim 3, wherein the weight is inversely proportional to the count of user interactions in the primary user feedback data.

6. The method of claim 1, wherein the search results refer to video resources.

7. The method of claim 1, wherein the search results refer to web resources.

8. The method of claim 1, wherein applying the weight to the secondary user feedback data comprises multiplying a count of targeted user interactions in the secondary user data by the weight to create the weighted secondary user feedback data.

9. The method of claim 8, wherein aggregating the primary user feedback data and the weighted secondary user feedback data comprises combining a count of targeted interactions in the primary user feedback data to the weighted target interactions count.

10. A computer storage medium encoded with a computer program, the program comprising instructions that when executed by data processing apparatus cause the data processing apparatus to perform operations comprising:

obtaining search results responsive to a query, each search result identifying a respective resource and each resource having a respective rank determined by a primary ranking algorithm;

for one or more of the respective resources:
obtaining primary user feedback data for the resource, the primary user feedback data representing a plurality of previous user interactions with the resource when the resource was presented as a search result responsive to the query and wherein the search result had a rank determined by the primary ranking algorithm;

obtaining secondary user feedback data for the resource, the secondary user feedback data representing a plurality of previous user interactions with the resource when the resource was presented as a search result responsive to the query and wherein the search result had a rank determined by a different secondary ranking algorithm;

applying a weight to the secondary user feedback data, the weight being at least partially based on a threshold quantity of the primary user feedback data; and aggregating the primary user feedback data and the weighted secondary user feedback data and modifying the respective rank of the resource as a search result for the query based at least partially on the aggregated data.

11. The medium of claim 10, wherein the primary user feedback data includes a first plurality of user interactions where the duration of each of the user interactions in the first plurality satisfies a first threshold; and in which the secondary user feedback data includes a second plurality of user interactions where the duration of each of the user interactions in the second plurality satisfies a second threshold.

12. The medium of claim 11, wherein the weight is further based on a count of user interactions in the primary user feedback data and a count of user interactions in the secondary user feedback data.

13. The medium of claim 12, wherein the weight is inversely proportional to the count of user interactions in the secondary user feedback data.

14. The medium of claim 12, wherein the weight is inversely proportional to the count of user interactions in the primary user feedback data.

15. The medium of claim 10, wherein the search results refer to video resources.

16. The medium of claim 10, wherein the search results refer to web resources.

17. The medium of claim 10, wherein applying the weight to the secondary user feedback data comprises multiplying a count of targeted user interactions in the secondary user data by the weight to create the weighted secondary user feedback data.

18. The medium of claim 17, wherein aggregating the primary user feedback data and the weighted secondary user feedback data comprises combining a count of targeted interactions in the primary user feedback data to the weighted target interactions count.

19. A system comprising:
one or more computers; and
a computer-readable medium coupled to the one or more computers having instructions stored thereon which, when executed by the one or more computers, cause the one or more computers to perform operations comprising:

obtaining search results responsive to a query, each search result identifying a respective resource and each resource having a respective rank determined by a primary ranking algorithm;

for one or more of the respective resources:
obtaining primary user feedback data for the resource, the primary user feedback data representing a plurality of previous user interactions with the resource when the resource was presented as a search result responsive to the query and wherein the search result had a rank determined by the primary ranking algorithm;

obtaining secondary user feedback data for the resource, the secondary user feedback data representing a plurality of previous user interactions with the resource when the resource was presented as a search result responsive to the query and wherein the search result had a rank determined by a different secondary ranking algorithm;

applying a weight to the secondary user feedback data, the weight being at least partially based on a threshold quantity of the primary user feedback data; and aggregating the primary user feedback data and the weighted secondary user feedback data and modifying the respective rank of the resource as a search result for the query based at least partially on the aggregated data.

20. The system of claim 19, wherein the primary user feedback data includes a first plurality of user interactions where the duration of each of the user interactions in the first plurality satisfies a first threshold; and in which the secondary user feedback data includes a second plurality of user interactions where the duration of each of the user interactions in the second plurality satisfies a second threshold.

21. The system of claim 20, wherein the weight is further based on a count of user interactions in the primary user feedback data and a count of user interactions in the secondary user feedback data.

22. The system of claim 20, wherein the weight is inversely proportional to the count of user interactions in the secondary user feedback data.

23. The system of claim 22, wherein the weight is inversely proportional to the count of user interactions in the primary user feedback data.

24. The system of claim 19, wherein the search results refer to video resources.

25. The system of claim 19, wherein the search results refer to web resources.

26. The system of claim 19, wherein applying the weight to the secondary user feedback data comprises multiplying a count of targeted user interactions in the secondary user data by the weight to create the weighted secondary user feedback data.

27. The system of claim 26, wherein aggregating the primary user feedback data and the weighted secondary user feedback data comprises combining a count of targeted interactions in the primary user feedback data to the weighted target interactions count.

* * * * *

UNITED STATES PATENT AND TRADEMARK OFFICE
CERTIFICATE OF CORRECTION

| | | |
|---|---|---|
| PATENT NO. | : 8,832,083 B1 | Page 1 of 1 |
| APPLICATION NO. | : 12/842345 | |
| DATED | : September 9, 2014 | |
| INVENTOR(S) | : Chen et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 577 days.

Signed and Sealed this
Twenty-fifth Day of August, 2015

Michelle K. Lee
*Director of the United States Patent and Trademark Office*